(12) United States Patent
Shimizu et al.

(10) Patent No.: US 8,709,648 B2
(45) Date of Patent: Apr. 29, 2014

(54) CONDUCTOR-MIXED ACTIVE ELECTRODE MATERIAL, ELECTRODE STRUCTURE, RECHARGEABLE BATTERY, AND MANUFACTURING METHOD OF CONDUCTOR-MIXED ACTIVE ELECTRODE MATERIAL

(75) Inventors: Tatsuo Shimizu, Sendai (JP); Zenzou Hashimoto, Koriyama (JP)

(73) Assignee: Ener1, Inc., Indianapolis, IN (US)

( * ) Notice: Subject to any disclaimer, the term of this patent is extended or adjusted under 35 U.S.C. 154(b) by 1237 days.

(21) Appl. No.: 12/106,186

(22) Filed: Apr. 18, 2008

(65) Prior Publication Data

US 2008/0261111 A1  Oct. 23, 2008

Related U.S. Application Data

(63) Continuation-in-part of application No. 10/516,959, filed on Dec. 3, 2004, now abandoned.

(30) Foreign Application Priority Data

Jun. 4, 2002  (JP) .................. 2002-163396
Jun. 7, 2002  (JP) .................. 2002-167507
Jun. 3, 2003  (WO) ............... PCT/JP03/07043

(51) Int. Cl.
*H01M 4/02*  (2006.01)

(52) U.S. Cl.
USPC ........................................ 429/209; 429/231.8

(58) Field of Classification Search
USPC ................ 429/209, 231.8, 218.1, 231.9, 233, 429/231.95
See application file for complete search history.

(56) References Cited

U.S. PATENT DOCUMENTS

| | | | | |
|---|---|---|---|---|
| 3,723,183 A * | 3/1973 | Greatbatch | ................... | 429/185 |
| 5,789,114 A | 8/1998 | Adachi et al. | | |
| 6,589,694 B1 | 7/2003 | Gosho et al. | | |
| 7,049,031 B2 * | 5/2006 | Johnson et al. | ............ | 429/231.1 |
| 2002/0172869 A1 * | 11/2002 | Kudo et al. | ................... | 429/232 |
| 2004/0224231 A1 * | 11/2004 | Fujimoto et al. | ............. | 429/232 |

FOREIGN PATENT DOCUMENTS

| | | |
|---|---|---|
| JP | S63-201322 | 12/1988 |
| JP | 1-105459 | 4/1989 |
| JP | H07-220759 | 8/1995 |
| JP | 9-97625 | 4/1997 |
| JP | 9-143503 | 6/1997 |

(Continued)

OTHER PUBLICATIONS

International Search Report and Written Opinion for PCT/JP03/07043, dated Jul. 1, 2003 (3 pgs).

(Continued)

*Primary Examiner* — Mark F Huff
*Assistant Examiner* — Monique Wills
(74) *Attorney, Agent, or Firm* — Faegre Baker Daniels LLP

(57) ABSTRACT

An object of the present invention is to enhance the electrical conductivity between active electrode materials, enhance the electrical conductivity between an active electrode material and an electrical conduction assistant agent, and enhance the conductivity between the active electrode material and a current collecting material. This invention is related in principle to a conductor-mixed active electrode material which is processed by stirring and mixing an active electrode material and a conductive material together with hard balls, an electrode structure utilizing this conductor-mixed active electrode material, a rechargeable battery, and a method of fabricating the conductor-mixed active electrode material.

20 Claims, 10 Drawing Sheets

(56) References Cited

FOREIGN PATENT DOCUMENTS

| | | |
|---|---|---|
| JP | 10-241665 | 9/1998 |
| JP | H10-312811 | 11/1998 |
| JP | 2000-77061 | 3/2000 |
| JP | 2000-268879 | 9/2000 |
| JP | 2000-285910 | 10/2000 |
| JP | 2001-250553 | 9/2001 |
| JP | 2001-351612 | 12/2001 |
| JP | 2002-33103 | 1/2002 |
| JP | 2002-42812 | 2/2002 |
| JP | 2002-110232 | 4/2002 |
| JP | 2002-117849 | 4/2002 |
| JP | 2002-289174 | 4/2002 |
| JP | 2002-158139 | 5/2002 |
| JP | 2004-47404 | 5/2002 |
| JP | 2005-358966 | 12/2002 |
| JP | 2003-36889 | 2/2003 |
| JP | 2003-86174 | 3/2003 |

OTHER PUBLICATIONS

European Search Report for EP 03 73 0813, dated Aug. 8, 2009 (2 pgs.).

\* cited by examiner

CONDUCTOR-MIXED ACTIVE ELECTRODE MATERIAL, ELECTRODE STRUCTURE, RECHARGEABLE BATTERY, AND MANUFACTURING METHOD OF CONDUCTOR-MIXED ACTIVE ELECTRODE MATERIAL

RELATED APPLICATIONS

This application is a continuation in part application that claims priority to U.S. patent application Ser. No. 10/516,959 filed on Dec. 3, 2004 and incorporated herewith by reference in its entirety.

FIELD OF THE INVENTION

The present invention relates to active materials for use as electrodes in electrical components, and also to electrode structures and batteries.

BACKGROUND OF THE INVENTION

Rechargeable nonaqueous electrolytic batteries are chemical batteries. Upon charging and discharging of a battery, an electrical current which is applied from a current collecting material is sent toward a positive polarity material of a positive electrode layer, followed by reaction of the positive pole material of the positive electrode layer. This results in outward release of ions, which are then absorbed in a negative electrode layer. Adversely, during discharge, those ions which were absorbed in the negative electrode layer are drawn out to return to the positive electrode layer. It has generally been believed that this reaction time controls charge/discharge speeds.

Additionally in rechargeable batteries, attempts have been made to fabricate an electrode structure by coating on a surface of current collecting material a mixture of an active electrode material and an assistant agent for promotion of electrical conduction, and then bonding by the adhesive force of a binder the active electrode material and the conduction assistant to the surface of the current collecting material. Unfortunately, this approach is faced with a risk which follows: when an increased amount of conduction assistant is added in order to enhance the electrical conductivity of the electrode structure, the binder increases in amount, resulting in a likewise increase in electrical resistance of the electrode structure.

Another approach is disclosed (see Published Japanese Patent Application No. JP-A-2000-58063), which adheres, without the use of any binder, a conductive material to an active electrode material by vapor deposition or sputter techniques to thereby ensure that the resultant surface coverage factor falls into a range of from 40% to 80%. However, when coating the surface of active electrode material at such the increased coverage of 40-80%, it is doubtful that it is possible to sufficiently derive the inherent characteristics and functions of the active electrode material. More specifically, it is also considered that a coated film can disturb or impede the release and absorption of ions by means of the active electrode material made of $LiCoO_2$ or the like, and that a membrane adhered by vapor deposition or sputtering to the active electrode material surface blocks a location for reaction of the active electrode material. Note here that the presence of such membrane makes it difficult to enhance the electrical conductivity between active electrode materials, because it does not protrude from the active electrode material surface.

OBJECT OF THE INVENTION

An object of the present invention is to enhance the electrical conductivity between active electrode materials.

Alternatively, an object of this invention is to enhance the conductivity between an active electrode material and a conduction assistant agent.

An alternative object of the invention is to enhance the conductivity between an active electrode material and a current collecting material.

Another alternative object of the invention is to provide an electrode structure which is excellent in performance.

A further another alternative object of the invention is to provide an electrical component having an electrode structure, which is excellent in performance.

SUMMARY OF THE INVENTION

The inventors as named herein have found out that a conductor-mixed active electrode material with excellent characteristics is manufacturable by performing the stirring and mixing (stirring blend) of an active electrode material and a conductive material together with hard balls. Thus it was possible to fabricate a conductor-mixed active electrode material with the conductive material and active electrode material mixed together, or a conductor-mixed active electrode material or a conductor-coupled active electrode material in which a conductive material is considered to be coupled. Whereby, in electrode structures of electrical components such as batteries and capacitors or equivalents thereto, it is likely that electrons and ions can increase in electrical conductivity. By mixing or coupling the conductive material around the active electrode material, it is possible to enhance the conductivity between neighboring active electrode materials, and also possible to enhance the conductivity between an active electrode material and its associated current collecting material. In addition, there is no risk to cover the active electrode material by a membrane, so the release and absorption of ions are readily performed. This encourages us to think that it is possible to sufficiently derive the inherent characteristics and functionalities of the active electrode material(s). The conductor-mixed electrode active material is also obtained by use of the ball mill without using the binder and without forming carbon layers.

A principal concept of the present invention lies in a conductor-mixed active electrode material, which is characterized in that its active electrode material and conductive material are specifically processed so that these are stirred and blended together with hard balls.

Another concept of this invention lies in an electrode structure which is characterized by comprising a current collecting material, and an electrode layer having a conductor-mixed active electrode material as processed by stirring and blending an active electrode material and a conductive material together with hard balls, wherein the electrode layer is formed on or above a surface of the current collecting material.

Another concept of this invention lies in a rechargeable battery which is featured by using, as at least one electrode, an electrode structure that comprises a current collecting material and an electrode layer having a conductor-mixed active electrode material as processed by stirring and blending an active electrode material and a conductive material together with hard balls, while letting the electrode layer be formed on or above a surface of the current collecting material.

Another concept of the invention lies in a method of manufacturing a conductor-mixed active electrode material, wherein an active electrode material and a conductive material are processed through stirring and mixing with hard balls.

Still another concept of the invention lies in a current collecting structure which comprises a current collecting material and a current collection layer having a conductor-mixed active electrode material with a flocculent conductive material being coupled around an active electrode material, wherein the current collection layer is situated on or above a surface of the current collecting material.

Yet another concept of the invention lies in a current collector structure which comprises a current collecting material, a current collection layer that has an electrical conduction assistant agent, and an anchor layer having a conductor-mixed active electrode material with a flocculent conductive material coupled thereto, wherein the conductor-mixed active electrode material bites into the current collection layer, while letting the current collection layer be disposed above a surface of the current collecting material and also letting the anchor layer overlie a surface of the current collector layer in a multilayer fashion.

Another concept of the invention lies in an electrode structure which comprises a current collecting material and an electrode layer having a conductor-mixed active electrode material with a flocculent conductive material coupled around an active electrode material, wherein the electrode layer is disposed on or above a surface of the conductive material.

A further another concept of the invention lies in either a rechargeable battery or a capacitor, which comprises a pair of electrode structures consisting essentially of an electrode structure that has on the surface of a current collecting material an electrode layer having a conductor-mixed active electrode material with a flocculent conductive material coupled around an active electrode material and an electrode structure having a current collecting material, characterized by having an electrolytic composition between the pair of electrode structures.

EXPLANATION OF REFERENCE NUMERALS

1 . . . Electrode Structure, 11 . . . Electrode Layer, 12 . . . Positive Electrode Structure, 13 . . . Negative Electrode Structure, 2 . . . Current Collecting Structure, 21 . . . Current Collection Layer, 22 . . . Anchor Layer, 23 . . . Electrical Conduction Assistant, 24 . . . Active electrode Material, 25 . . . Anchor Material, 3 . . . Current Collecting Material, 31 . . . Oxide Membrane, 4 . . . Battery, 41 . . . Electrolytic Substance, 42 . . . Separator, 5 . . . Manufacturing Apparatus of Conductor-Mixed Active electrode Material, 51 . . . Active electrode Material Powder, 52 . . . Conductive Material Powder, 53 . . . Processing Vessel, 6 . . . Barrel, 61 . . . In/Out Port, 62 . . . Lid, 63 . . . Hard Balls, 64 . . . Flowage Plates, 7 . . . Drier Device, 71 . . . Unwind Unit, 72 . . . Winding Unit, 73 . . . Coating Device, 731 . . . Doctor Blade Coater Head, 732 . . . Mixture, 74 . . . Exhaust Port, 741 . . . Hot Air Nozzles, 75 . . . Conveyer, 76 . . . Transfer Rollers, 8 . . . Presser Device, 81 . . . Heating Unit, 82 . . . Heaters, 83 . . . Presser Unit, 84 . . . Work Roll, 85 . . . Backup Roll, 86 . . . Pressure Device, 9 . . . Beaker Battery, 91 . . . Vessel, 92 . . . Positive Pole, 93 . . . Counter-Pole, 94 . . . Reference Pole, 95 . . . Electrolytic Solution.

MODES OF CARRYING OUT OF THE INVENTION

Currently preferred embodiments of the present invention will be explained with reference to the accompanying drawings below.

1. Electrodes of Electrical Component Such as Battery or Capacitor

Figure 1A:
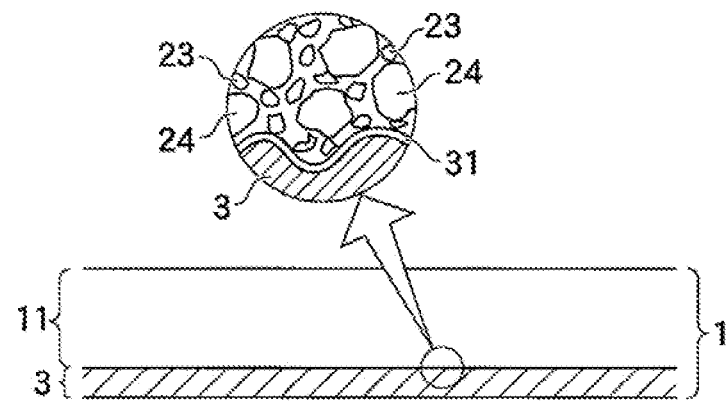
FIGS. 1A to 1C is a diagram for explanation of electrode structures.
Figure 1B:
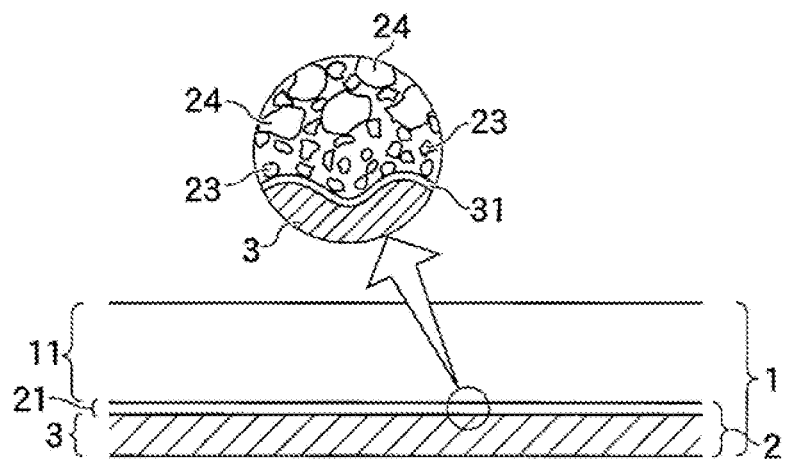
Figure 1C:
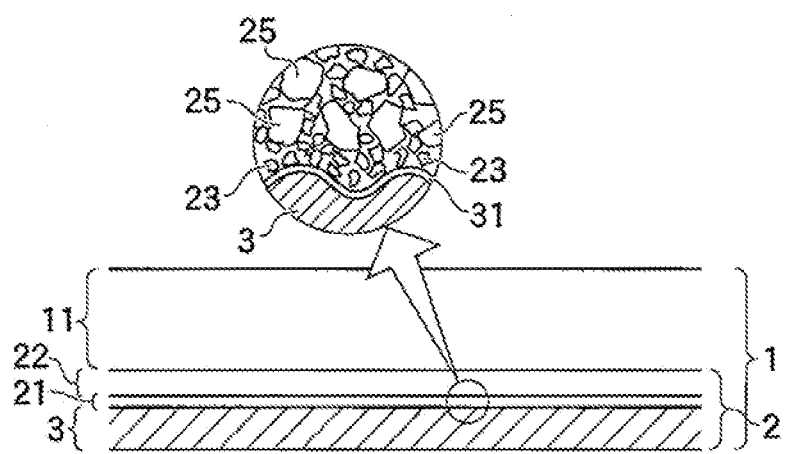

An electrode of a battery or a capacitor (electrical double-layered capacitor, electric double-layer condenser) is the one that is capable of passing and receiving electricity to and from ions or the one with an ability to attract ions. To this end, the electrode is designed to have an electrode structure 1 such as shown in FIG. 1 for example, which has an ion-receivable/passable electrode layer 11 formed on a top surface of a current collecting material 3. As for the electrode structure 1, there is a structure which has the electrode layer 11 formed on the surface of current collecting material 3 as shown in FIG. 1A, a structure having a current collection layer 21 formed on the surface of current collecting material 3 and also having an electrode layer 11 formed thereon as shown in FIG. 1B, or a structure having a current collector layer 21 formed on the surface of current collecting material 3 and an anchor layer 22 formed thereon and further including an electrode layer 11 formed on the anchor layer 22 as shown in FIG. 1C. It is noted here that the language "on the surface" may be interpreted as either direct contact with the surface or a layout with another layer interposed between surfaces.

The electrode layer of a positive electrode structure 12 of a battery is typically made of an active electrode material such as $LiMn_2O_4$ or equivalents thereto. In the case of a negative electrode structure 13, an active electrode material such as graphite or hard carbon or else is used. Additionally, the electrode layers of the positive and negative electrode structures of a capacitor are made of an active electrode material which has an increased surface area and thus offers the attachability of a great number of ions, such as lithium ions.

Figure 2A:
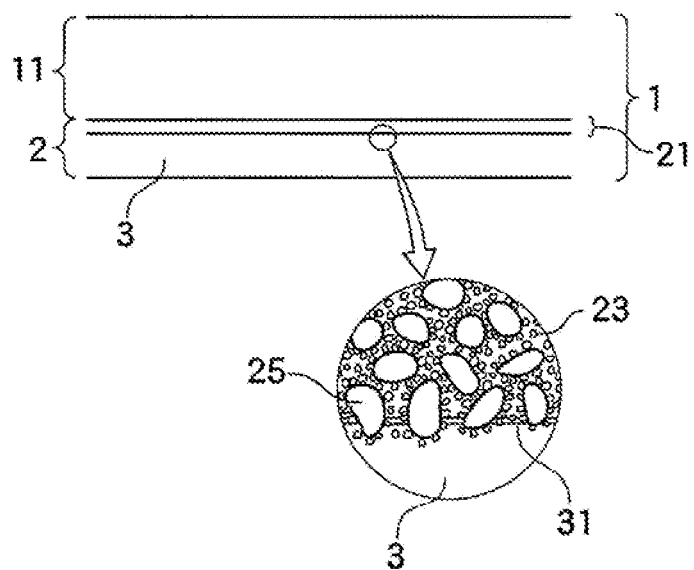
FIGS. 2A to 2B is an explanation diagram of a battery structure.
Figure 2B:
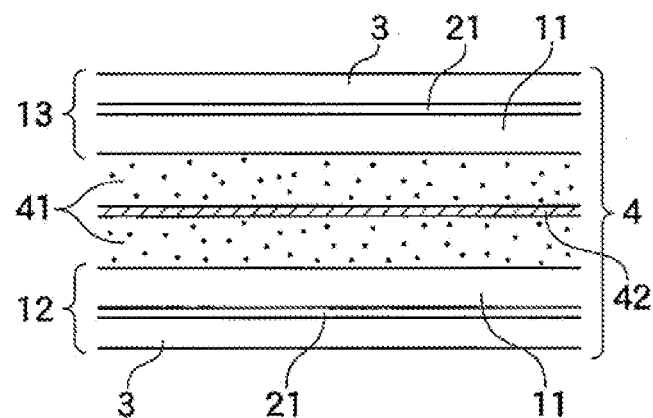

Either a battery 4 or a capacitor is arranged for example as shown in FIG. 2B so that the positive electrode structure 12 and the negative electrode structure 13 are disposed to spatially oppose each other with a separator 42 being intermediately situated therebetween, while letting an electrolytic substance 41, such as an electrolysis solution, be laid out between the electrode structures and the separator.

2. Active Electrode Material

An active electrode material 42 is the one that sends and receives ions. For example, in the case of a lithium battery, the active material for use as its positive electrode may be lithium-based active material such as LiCoO$_2$, LiNiO$_2$, LiM$_n$2O$_4$ or the like. Examples of a negative active material are chosen metals, such as carbon-based material, lithium metal or else.

A large surface-area material is usable as an active electrode material 24 of capacitor. In particular, an active carbon is preferable, which is obtained through activation of a carbon material by use of a vapor activation processing method, fused-KOH activation processing method or equivalents thereof. Typical examples of the active carbon include, but not limited to, palm-based active carbon, phenol-based active carbon, petroleum coke-based active carbon, and polyacene. One or some of these materials may be used solely or in combination of more than two materials thereof. Among them, the phenol-based active carbon, petroleum coke-based active carbon and/or polyacene is preferable in order to realize large electrostatic capacitances.

3. Conduction Assistant

A conduction assistant agent 23 is the one that is high in electrical conducting property and thus enhances the conductivity of the electrode structure 1. When used in the current collector layer 21, the conduction assistant 23 may be the one that is less in diameter than the anchor material 25 and is readily attachable to portions around the anchor material 25. In case the conduction assistant 23 is in contact with a passive-state aluminum skin film or membrane, the conduction assistant 23 is preferably made of carbon material. Recent estimates show that the passive membrane increases in conductivity at portions whereat the carbon material is attached to the passive membrane. Examples of the conduction assistant 23 are carbon fibers including, but not limited to, carbon black, Ketjen Black, acetylene black, carbon whisker, native black lead or graphite, artificial graphite, VGCF, and carbon nanotube, any one of which is usable in sole or more than two of which are employable in combination. Among them, Ketjen Black or acetylene black is preferable, which is one kind of carbon black material.

4. Conductor-Mixed Active Electrode Material

The conductor-mixed active electrode material is the one that has a mixture of a conductive material and an active electrode material 24 or alternatively the one having a conductive material and active electrode material 24 coupled together. The term "mixture" or "coupled" as used herein may refer to a state capable of exerting the characteristics and functionalities of the active electrode material to thereby provide certain capabilities including an ability to facilitate movement or migration of electrons between the conductive material and the active electrode material without the use of a binder, and an ability to permit entry and exit of ions, such as ion release and absorption. In particular, it is considered that the coupling is a state that the conductive material is coupled to part around the active electrode material in a flocculent form. The flocculent form refers to a state that consists essentially of a floc-like form, mold-like form, whiskery form, linear shape, filiform and others. The conductor-mixed active electrode material is considered so that small flocculent conductive material components are coupled around the active electrode material 24 in the form of dots. Note here that the dot-like form should not be limited to a single dot and may also consist of a plurality of dots: this form refers to a state that eliminates sheet-like coverage to thereby avoid substantial restraint of the release and absorption of the ions of active electrode material. The conductor-mixed active electrode material is adaptable for use in electrical components such as batteries or capacitors (condensers).

5. Current Collecting Material

For the current collecting material 3, certain material is used which is extremely high in electrical conduction property. Aluminium foil is typically used as the current collecting material 3 of a positive electrode, whereas copper foil or metal (Li metal in the case of a Li battery) is used as the current collection material 3 of a negative electrode, by way of example. It is recommendable to form one or more recess portions in the surface of current collecting material 3 of at least one, preferably both, of a pair of electrode structures 1. With such an arrangement, it is possible to increase the area of an interface with a layer in contact with the current collecting material 3, such as for example the electrode layer 11 or the current collector layer 21, thereby making it possible to reduce the electrical contact resistance. In addition, the presence of such recesses makes it possible to enhance the close physical contact with the layer being in contact with the current collecting material 3, thereby enabling achievement of rigid adhesion of the electrode layer 11 or current collector layer 21 to be contacted with the current collecting material 3. The recesses of the current collecting material 3 are designed to measure approximately 0.1 μm to 2 μm in center-line average roughness Ra relying on surface irregularity standards.

The aluminium foil has its surface on which an oxide membrane is naturally formed at the stage of electrode fabrication. After having assembled into a battery or a capacitor, when an electrolytic solution is injected resulting in a flow of current, a membrane with passivity can sometimes takes place on the surface thereof. This passive membrane is capable of preventing corrosion of the current collecting material 3 otherwise occurring due to the electrolyte. It is also possible to permit the current collecting material 3 to obtain improvements in corrosion resistance. On the other hand, although the passive membrane has dielectricity so that this limits the magnitude of a current flowing in the electrode, it is contemplated that the resulting conductivity gets higher for the following reason: contacting carbon particles with the passive membrane results in occurrence of dot-like defects in part of the passive membrane adjacent to the carbon particle's contact portions. Consequently, owing to both an increase in interface area by the recesses of the current collecting material 3 and the contact of a great amount of conduction assistant near the interfaces of the recesses due to the fact that the conduction assistant less in size than the recesses enters the inside of such recesses, a multiplicity of dot defects take place at the interface of the conductive material. Thus it is possible to reduce the electrical resistance.

The current collecting material 3 may be arranged so that an electrode layer 11 is formed on its one-side surface or, alternatively, electrode layers 11 are formed on the both surfaces. Whether the one-side or the both-side design is to be employed is determinable depending upon how the electrode structure 1 is used in electrical equipment with a battery or a capacitor.

6. Current Collector Structure

The current collector structure 2 is such that a current collection layer 21 is formed at the current collecting material 3 to thereby reduce the electrical resistance of the interface of current collecting material 3. The current collector structure 2 is used for the electrode structure 1 of a battery or a capacitor. The current collector layer 21 has an electrical conduction assistant agent 23 and a binder, and is formed by adhesion of the conduction assistant 23 to the surface of current collecting material 3 as shown in FIG. 1B by way of example. This may be thinly formed to a thickness of about several microns, for example. It is also permissible to further add an anchor material 25 to the current collecting material 3.

In the case of adding the anchor material 25, the anchor material 25 is partly depressed by strong push force against the current collecting material 3 to thereby provide tight adhesion therebetween. It is recommendable to rigidly adhere the conduction assistant 23 to the surface of current collecting material 3. By adhering the anchor material 25 to the surface of current collecting material 3 made of aluminum and also by utilizing the binder's bonding force, the anchor material 25 is rigidly adhered to the current collecting material 3. Let the conduction assistant 23 be attached also to peripheral portions of the anchor material 25, thereby making it possible to fix it to nearby portions of the surface of current collecting material 3 along with anchor material 25. It is also possible for conduction assistant 23 to come much closer to the surface of current collecting material 3. By the formation of this current collector layer 21, it is possible to increase dot defects at the interface of the current collecting material 3, thus making it possible to reduce the electrical resistance. Preferably, the current collector layer has a thickness ranging from 0.5 µm to 10 µm; more preferably, it is set at 1 to 3 µm.

For example, as in the current collector structure of FIG. 1C, attach to the current collecting material 3 a current collector layer which consists essentially of a conduction assistant 23 and a binder. Next attached onto the current collector layer 21 is a second layer that is comprised of an anchor material 25 and conduction assistant 23 plus binder, thereby completing an anchor layer 22. In this event, strong compressive force (e.g., rotation pressure) is used to cause the anchor material 25 to be rigidly attached to either the current collector layer 21 or the current collecting material 3. With the use of such two-layer lamination of the current collector layer 21 and anchor layer 22, it is possible to fix the conduction assistant 23 to the current collecting material 3 while allowing the former to come much closer to the latter at a high density. Preferably the anchor layer is 2 µm to 20 µm in thickness; more preferably, 5 to 10 µm. Additionally, the current collecting materials 3 of FIGS. 1A to 1C are examples that employ those having recess portions. The conductor-mixed electrode active material is also obtained by use of the ball mill without using the binder and without forming carbon layers.

7. Anchor Material

The anchor material 25 is latched to the surface of the current collecting material 3—that is, rigidly attached and fixed to the surface. For example, strong push force is applied to tightly adhere the material to the surface of current collecting material 3 so that it is strongly adhered by use of the bonding force of the binder. The anchor material 25 may be the one having its surface to which the conduction assistant 23 is readily attachable. To this end, certain material is preferable which has convexo-concave portions on its surface and which is larger than conduction assistant 23. The anchor material 25 may preferably be conductive material, active electrode material 24 or conductor-mixed active electrode material. The conductive material can enhance, together with the functionality of the anchor, the electrical conduction property with respect to the current collecting material interface. In addition, the active electrode material 24 is also capable of playing a role of ion-exchangeable electrode layer 11, together with the functionality of the anchor. It is considered that as shown in FIG. 2A, the anchor material 25 bites into the surface of the current collecting material 3 together with the conduction assistant 23 thus attached, which can lead to breaks in a membrane such as an oxide skin film on the surface of current collecting material, resulting in direct contact with metal part of the current collecting material. What is required for the anchor material 25 is merely to provide the anchor function. Preferably, unitary particles with a diameter of 0.5 µm to 30 µm or an ensemble of tuft-like coupled particles resembling in shape grape clusters may be used.

8. Electrode Layer

The electrode layer 11 has a conductor-mixed active electrode material and conduction assistant 23 plus binder, for causing ions to reversibly flow to and from an electrolytic material 41. The electrode layer 11 is formed on the surfaces of current collecting material 3, current collector layer 21 or anchor layer 22. The electrode layer 11 is designable to contain less amounts of conduction assistant 23 and binder. The electrode layer 11 is such that conductor-mixed active electrode material is used for at least one of the positive active electrode material 12 and negative active electrode material 13. Preferably the electrode layer is 10 µm to 120 µm thick; more preferably, 50 to 80 µm.

9. Binder

The binder is for attachment of the current collector layer 21, electrode layer 11, active electrode material 24 and conduction assistant 23 or the like onto the surface of the current collecting material 3. For example, PVDF or the like is used.

10. Electrolytic Substance

The electrolytic substance 41 is in the form of a liquid, gel or solid, and is the one that allows ions to move or flow between the positive electrode structure 12 and the negative electrode structure 13. For example, dibutyl ether or 1,2-dimethoxyethane or else is usable.

11. Separator

The separator 42 is the one that prevents any electrical contact between positive and negative electrode structures and enables penetration of ions. For instance, porous material such as polyethylene, polypropylene or else is employable.

An explanation will now be given of a method for manufacturing the conductor-mixed active electrode material and current collecting material below.

1. Conductor-Mixed Active Electrode Material Manufacturing Apparatus

Figure 3:
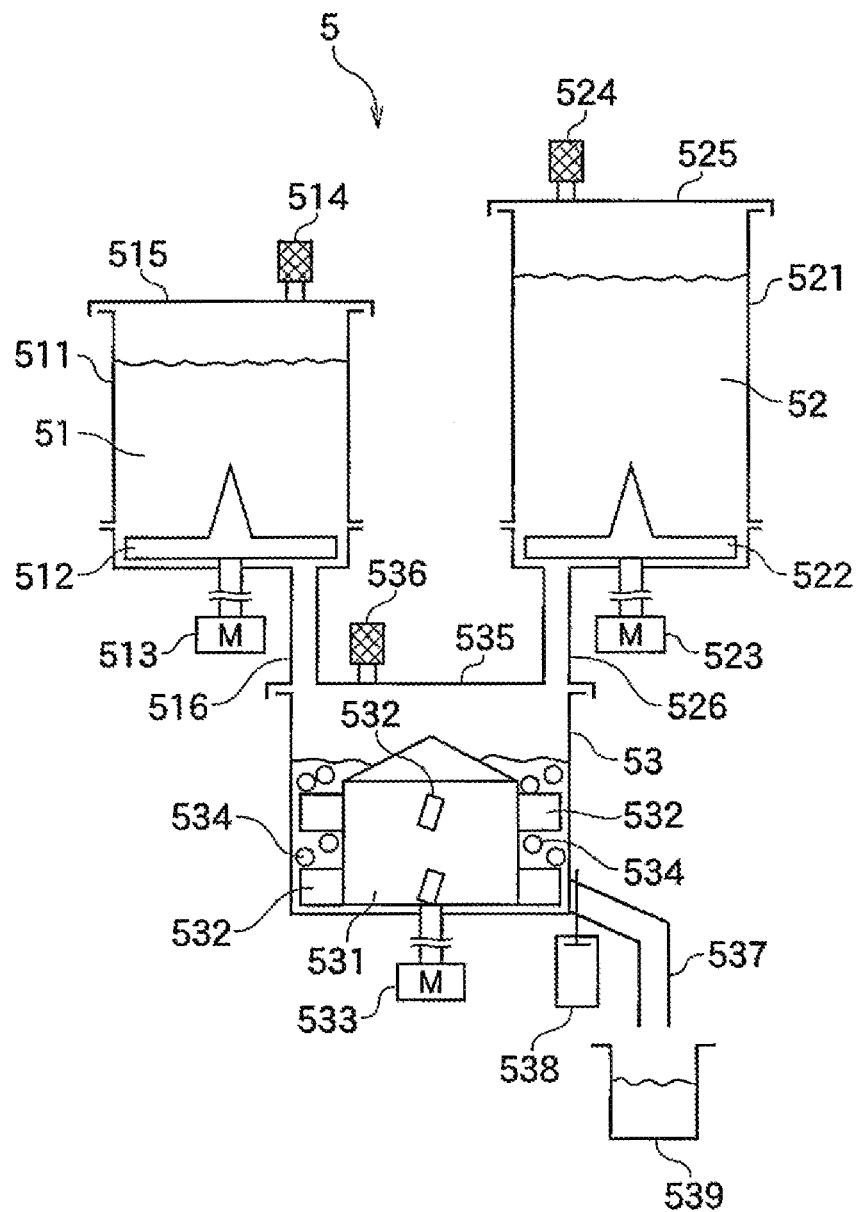
FIG. 3 is an explanation diagram of a manufacturing apparatus (H-type fabrication apparatus) of a conductor-mixed active electrode material.

An exemplary manufacturing apparatus of a conductor-mixed active electrode material is shown in FIG. 3. Shown herein is an H-type fabrication apparatus (vertical rotation type). This fabrication apparatus comprises an active electrode material supplying vessel 511 which contains therein active electrode material powder 51, and a conductive material supplying vessel 521 that contains conductive material power 52. Each vessel 511, 521 has a constant-amount cut-out blade 512, 522, which is driven by a driving device 513, 523, such as a motor. In addition, each vessel 511, 521 has a breather 514, 524 for adjustment of air pressure. Each vessel 511, 521 is sealable by a lid 515, 525. Each vessel 511, 521 is connected to a processing vessel 53 by an intake passage 516, 526. Attached to the processing vessel 53 are a core 531 that is rotation-driven by a driving device 533, such as a motor, and stirring blades 532 mounted around the core 531. In the processing vessel 53 also, a large number of hard balls 534 are stored, such as those made of steel, stainless-steel or the like. The hard balls 534 are such that steel balls, stainless-steel balls, ceramic balls, Teflon® lining balls or other similar suitable ones are usable. The core 531 is rotatable at speeds covering from a low speed up to a high speed of several thousand revolutions per minute, for example. The processing vessel 53 is air-tightly sealable by a lid 535, and is provided with a breather 536. The processing vessel 53 is coupled to an exhaust passage 537. This exhaust passage 537 is opened and closed by an open-close device 538. The exhaust passage 537 is installed to extend up to a processed-material storing vessel or reservoir 539.

Figure 4:
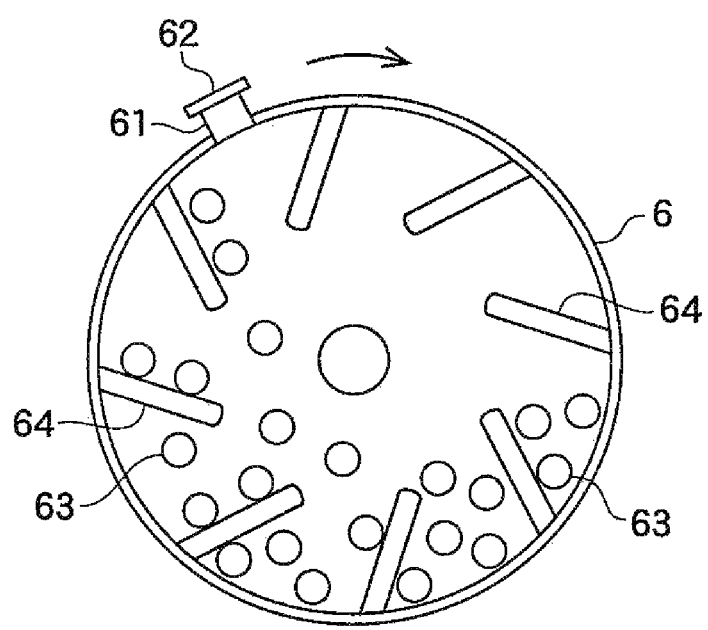
FIG. 4 is an explanation diagram of another conductor-mixed active electrode material manufacturing apparatus (L-type fabrication apparatus).

Another exemplary manufacturing apparatus is shown in FIG. 4. Shown herein is an L-type fabrication apparatus (horizontal rotation type). This fabrication apparatus comprises a barrel 6 that is rotatable horizontally. The barrel 6 includes an inflow/outflow port 61 having a lid 62. An active electrode material or conductive material is taken into and out of the in/out port 61, along with hard balls 63. The hard balls 63 of this apparatus may preferably be certain ones that are large in weight. Flowage plates 64 are mounted within the barrel 6.

2. Using Conductor-Mixed Active Electrode Material Fabrication Apparatus

In the case of the H-type fabrication apparatus, an active electrode material 51 in the form of finely-divided particulates is put in the active electrode material-use vessel 511 while letting a powdery conductive material 52 in the form of fine particles be stored in the conductive material-use vessel 521. These particulate materials are such that an appropriate amount of powder is taken out while causing the driver device 513, 523 to drive the constant-amount cutout blade 512, 522 of each vessel 511, 521, and then introduced into the processing vessel 53 via the intake passage 516, 526. In this event, the breather 514, 524 operates to adjust an internal pressure of each vessel 511, 521. The driver device 533 of processing vessel 53 drives the core 531 whereby the active electrode material and the conductive material are stirred by the blades 532 together with the hard balls 534 in the processing vessel 53 so that impact force or shock is applied by hard balls 534 or else to the active electrode material and conductive material to thereby enable execution of stirring and mixing processes, resulting in the conductive material being blended with the active electrode material. Thus a conductor-mixed active electrode material is obtained. The processed particulates and conductor-mixed active electrode material are exhausted to the processed vessel 539 while causing the exhaust passage 537 to be opened and closed by the open-close device 538.

In the case of the L-type fabrication apparatus, introduce into the barrel 6 the particulates of an active electrode material and a conductive material to be processed together. Upon rotation of the barrel 6 in a direction indicated by arrow, the active electrode material and conductive material are rotated and mixed together with hard balls 63 by the flowage plates 64 or the like, and then behave to drop down along with the hard balls 63; thus, the intended stirring and blending operations are performed. Whereby, the active electrode material and conductive material are applied shocks so that the conductive material is blended with the active electrode material. Thus a conductor-mixed active electrode material is obtained. Open the lid 62 to take it out of the in/out port 61.

3. Preparing Current Collecting Material with Recesses

As one method of forming recess portions in the current collecting material 3, a hydro-honing method is employable. This method includes the step of uniformly spraying, by a compressed air, a composite material with a mixture of an abradant and a fluid such as water along with an oxidation inhibitor or antioxidant from one or more nozzles onto a foil surface of the current collecting material 3. Immediately after the processing, cleaning is done, followed by the blowing of hot air to dry a cleaning liquid. The resultant surface roughness is set so that the along-the-center-line average roughness Ra is about 0.1 μm to 2 μm.

An embodiment of the lithium rechargeable battery will be explained below.

1. Conductor-Mixed Active Electrode Material

The conductor-mixed active material for electrodes is manufacturable by conductor-mixed active electrode material fabrication apparatus using a chosen positive active material and an electrical conduction assistant agent made of a conductive material. Used as the particulate of the active electrode material was a lithiated intercalation compound such as lithium manganate $LiMn_2O_4$ (LM-9, manufactured by Nikki Chemical Co., Ltd.). The conductive material used was Ketjen Black (Ketjen Black EC commercially available from Ketjen Black International Company) KB. The $LiMn_2O_4$ and KB are mixed together at a ratio of 82.22% to 17.78% (by weight) and then introduced into the fabrication apparatus of conductor-mixed active electrode material, followed by execution of the processing for about 4 hours.

2. Microphotographs

Figure 5:
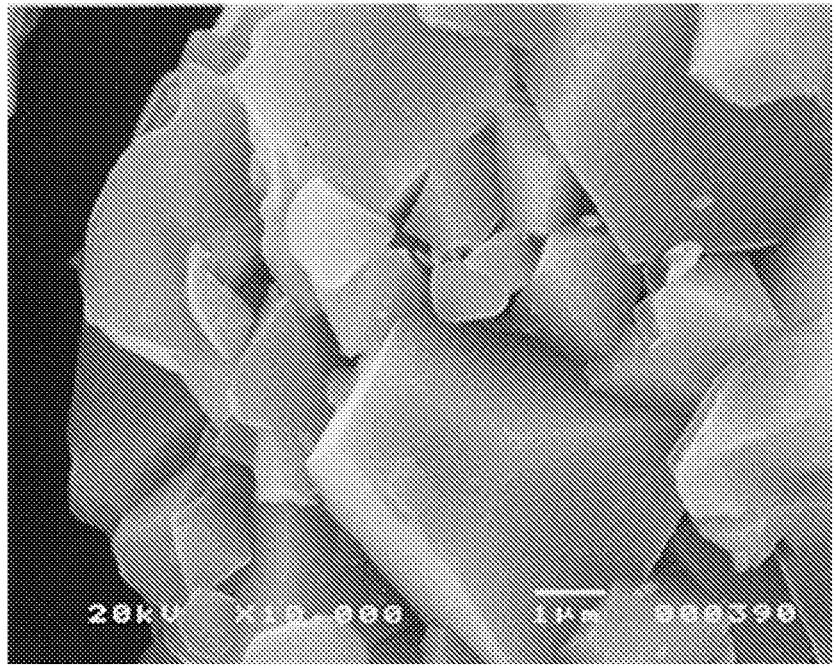
FIG. 5 shows a scanning electron microscope (SEM) photograph of $LiMn_2O_4$.

A scanning electron microscope (SEM) photograph of the particulate of lithium manganate LiMn2O4 for use as a raw material is shown in FIG. 5. This electron-microscope photograph is ten thousands in magnification, with a line segment of 1 μm added for indication of the actual size scale. FIG. 5 shows part of a single particle of the lithium manganate, which particle has a shape with multiple small crystals coupled together. Each small crystal coupled has its surface that exhibits a clean flat plane. At a corner portion of each small bonded crystal, respective planes intersect together and are sharp in edges.

Figure 6:
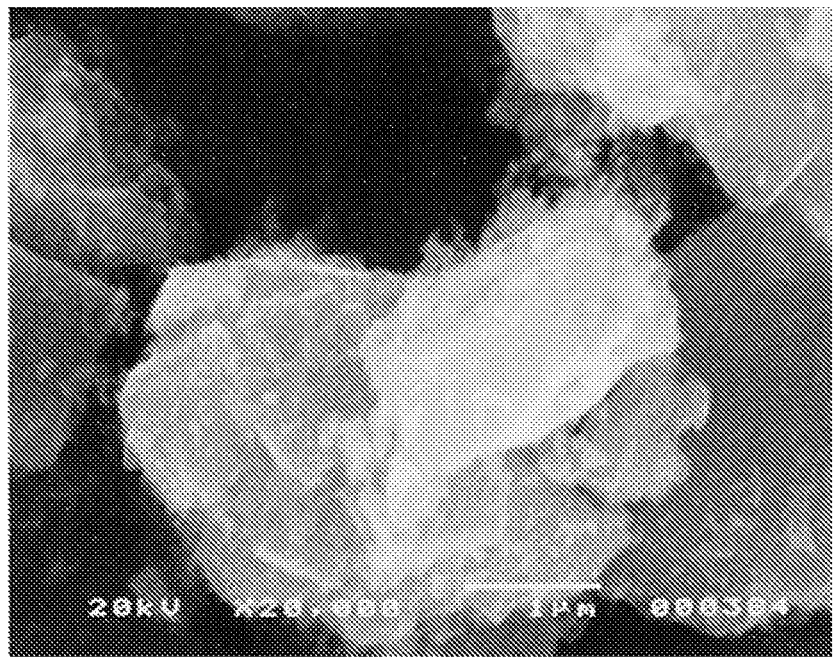
FIG. 6 shows an electron micrograph (SEM) of conductor-mixed active electrode material.

An electron microscope photograph (SEM) of the powder particles of the conductor-mixed active electrode material thus processed is shown in FIG. 6. This electron-microscope photograph is twenty thousands in magnification, with a line segment of 1 μm added in order to indicate the size scale. FIG. 6 shows that the surfaces of lithium manganate are in a flocculent state, which is different from a surface state prior to processing. A mixture of innumerable flocculent conductive material components is present around the lithium manganate. In particular, it is considered that myriad flocculent conductive materials are coupled to the surfaces of crushed and lessened lithium manganate particulates. For example, in case the conductor-mixed active electrode material is used for electrode structures, the presence of this flocculent conductive material leads to enhancement of the electrical conductivity between active electrode materials. Additionally, since the surfaces of such active electrode materials are not coated against the entry and exit of ions, it is possible to sufficiently derive the characteristics and functionalities inherent to the active electrode material(s).

3. Preparing Current Collecting Material with Recesses

As one method of forming recesses in the current collecting material 3, a hydro-honing processing technique is employable. This method includes the step of uniformly spraying, by a compressed air, a composite material with a blend of an abradant, a fluid such as water and an antioxidant from a nozzle(s) onto a foil surface of the current collecting material 3. Immediately after the processing, cleaning is done, followed by the blowing of hot air to dry a cleaning fluid. The surface roughness obtained thereby is set so that the along-the-center-line average roughness Ra is about 0.1 to 2 μm.

4. Positive Electrode Structure

Figure 7:
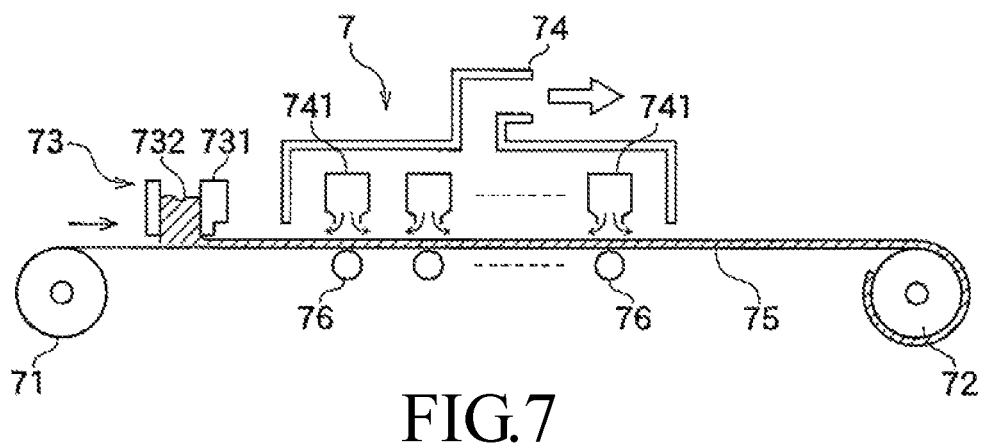
FIG. 7 is an explanation diagram of a coating device and a dryer device.

The positive electrode structure was formed by coating on aluminium foil a mixture of a conductor-blended active electrode material and binder plus solvent. A current collecting material as used herein was aluminium foil (manufactured by Showa Denko Kabushiki Kaisha, with its along-the-centerline average roughness Ra of 0.623 μm). The binder used was PVDF (available from Kureha Chemical Industry Co., Ltd.). Ratios of electrode layer components are set as follows: 71.20 percent by weight of $LiMn_2O_4$, 15.40% by wt of KB, and 13.40 wt % of PVDF. Added to this material was NMP (N-methyl-2-pyrrolidone) so that its solid components become about 50%. This mixture is stirred by a mixer. After the stirring, a slurry is coated by a doctor blade method onto the aluminum foil to a thickness of over ten microns. To perform the coating, for example as shown in FIG. 7, wind a sheet of current collecting material 3 out of an unwind unit 71; then, let it travel through a coating device 73 and drier device 7; next, transfer by a conveyer 75 and transfer rollers 76; then, wind up by a rewinding unit 72. The coater device 73 contains therein a mixture for the electrode layer use. By rewinding the current collecting material 3 by the rewinder unit 72, the mixture 732 is coated onto the current collecting material 3 by a doctor blade coater head 731. The current collector 3 with the mixture 732 coated thereon is then guided to enter the drier device 7 whereby the coated mixture 732 is blown with hot air from nozzles 741 so that the solvent is vaporized and dried. Vapored gasses are exhausted from an exhaust port 74.

Figure 8:
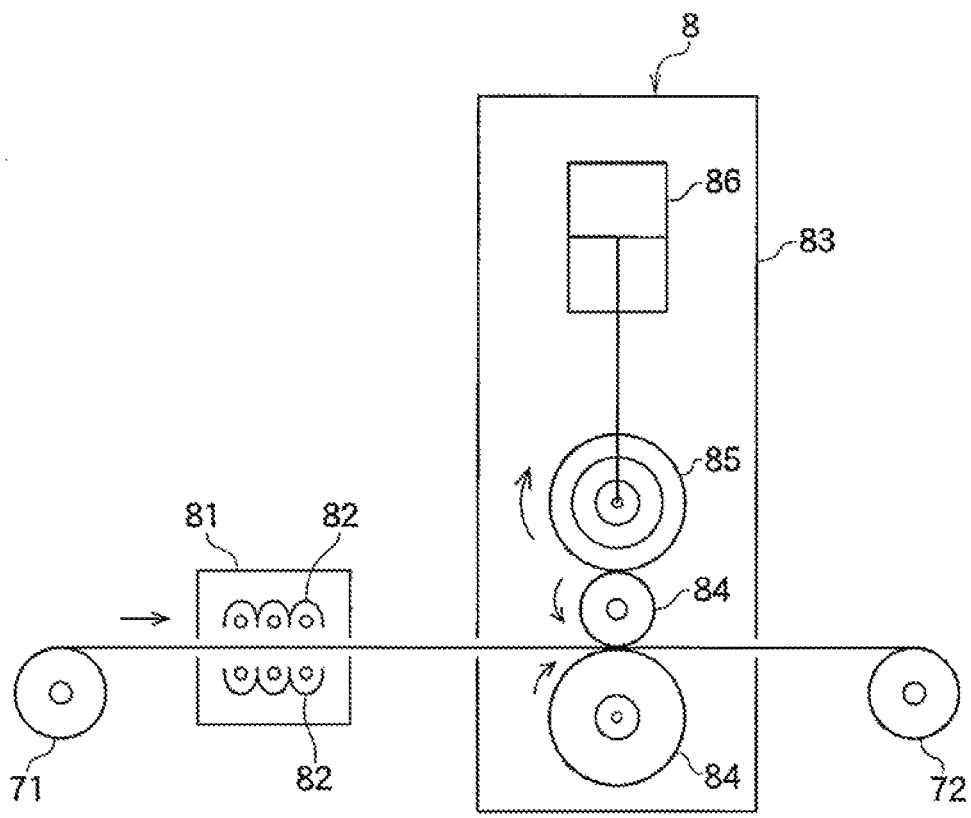
FIG. 8 is an explanation diagram of a heating device and a compressing device.

After having dried, a compressor device is used to perform rolling processing. An electrode structure 1 having the dried coat layer is pressed by a thermal presser device 8 as shown in FIG. 8 for example. For this pressing, there are options which follow: pressing is performed at room temperature (room-temperature press); and, press is done during heating (hot press). In the case of the thermal pressing, heaters 82 of a heating unit 81 are used to heat up to a temperature of 80° C. to 130° C., for example. A presser unit 83 has a super press of our company (including a pair of work rolls 84, i.e., a small-diameter roll with a diameter of 15 cm, and a large-diameter roll with its diameter of 25 cm), wherein it is desirable to set at 300 to 1000 kg/cm. It should be noted here that the small-diameter work roll 84 and large-diameter work roll 84 are replaceable with a pair of small-diameter rolls. Also note that the above-noted super press of the presser device 7 is arranged so that the work roll 84 is made smaller in diameter while lessening its contact area with an object to be pressed, such as an electrode structure, thereby making it possible to apply a large pressing force (this is called the rolling pressure since it is a pressure occurring due to rotation). As an alternative thereto, a large-diameter backup roll 85 is used to prevent flexure of the work roll(s) 84.

5. Lithium Rechargeable Battery

Figure 9:
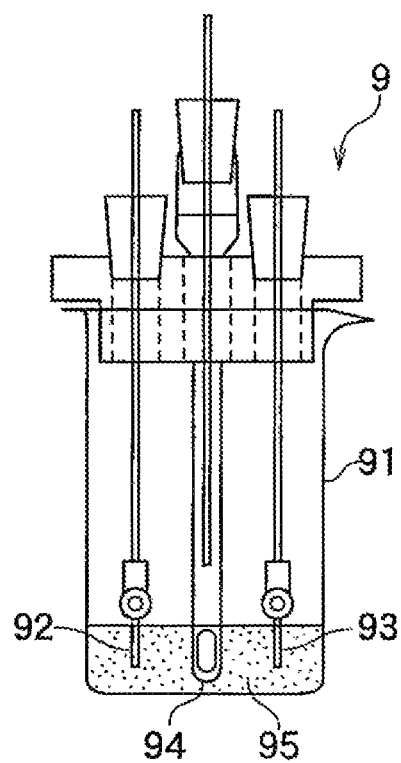
FIG. 9 is an explanation diagram of a beaker battery.

The lithium rechargeable battery may be a beaker cell 9 using a beaker-like vessel 91 such as shown in FIG. 9. A positive pole 92 is a positive electrode structure that uses a conductor-mixed active electrode material having its area of about 0.4 $cm^2$. A counter electrode or anti-pole 93 was made of Pt metal. The positive pole and antipole are spaced apart from each other by a distance of 1 cm. A reference pole 94 was made of Ag. An electrolytic solution 95 used here was $LiPF_6$/PC+DME (50:50) of 1M.

6. Charge/Discharge Curve of Lithium Rechargeable Battery

Figure 10A:
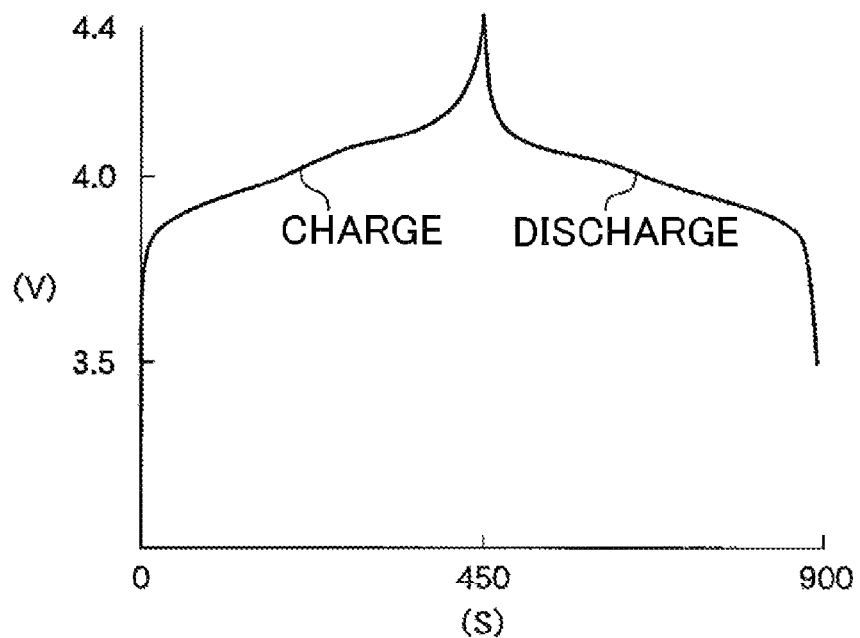
FIGS. 10A to 10B shows graphs of charge/discharge measurement values of a lithium rechargeable battery cell.

One exemplary voltage-versus-time curve at the time the lithium rechargeable battery is charged and discharged by a current of 0.2 mA is graphically shown in FIG. 10A. This graph shows that charging is carried out for 450 seconds up to a cut-off voltage of 4.4V, followed by discharge during the next 450 seconds. As apparent from viewing this curve, the charge capacity becomes 90 mAs and the discharge capacity was 90 mAs.

Figure 10B:
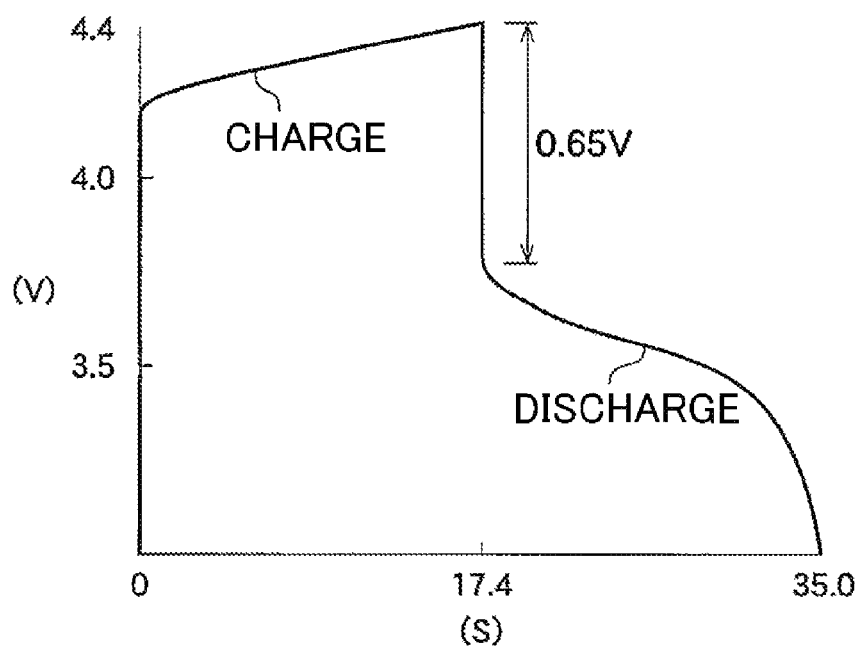

Another exemplary voltage-time curve during charge-up of the lithium rechargeable battery using a current of 26 mA is shown in FIG. 10B. This graph shows that charge is done for 17.4 seconds up to a cutoff voltage of 4.4V, followed by discharge for the next 17.6 seconds. As apparent from this curve, the charge capacity becomes 45.24 mAs and the discharge capacity was 45.76 mAs. The electrical resistance of the electrolyte is obtainable from a voltage difference of 0.65V when switching from the chargeup to discharge—it was 125Ω.

Figure 11A:
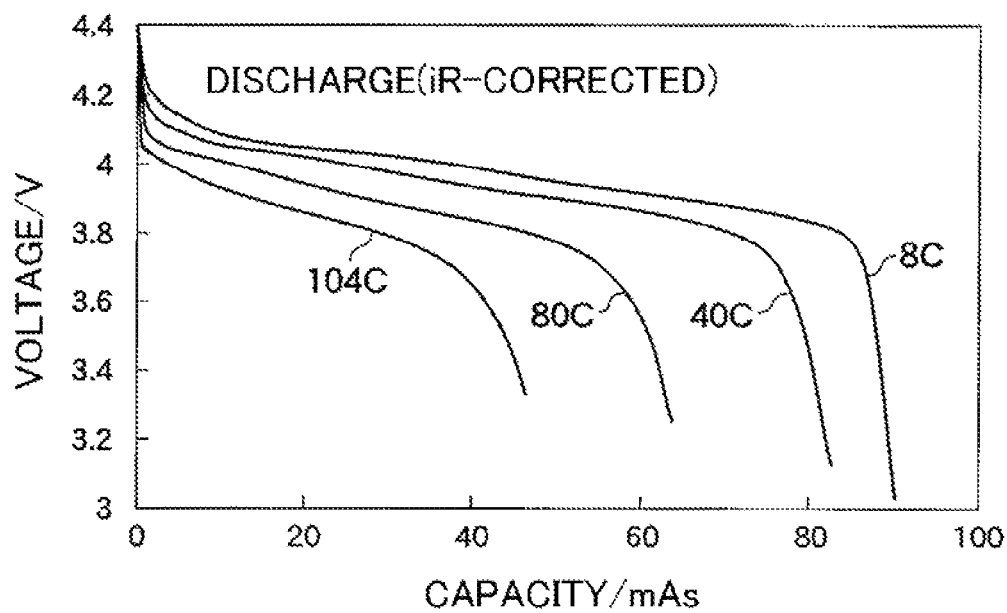
FIGS. 11A to 11B shows graphs of charge/discharge capacities of a lithium rechargeable battery.
Figure 11B:
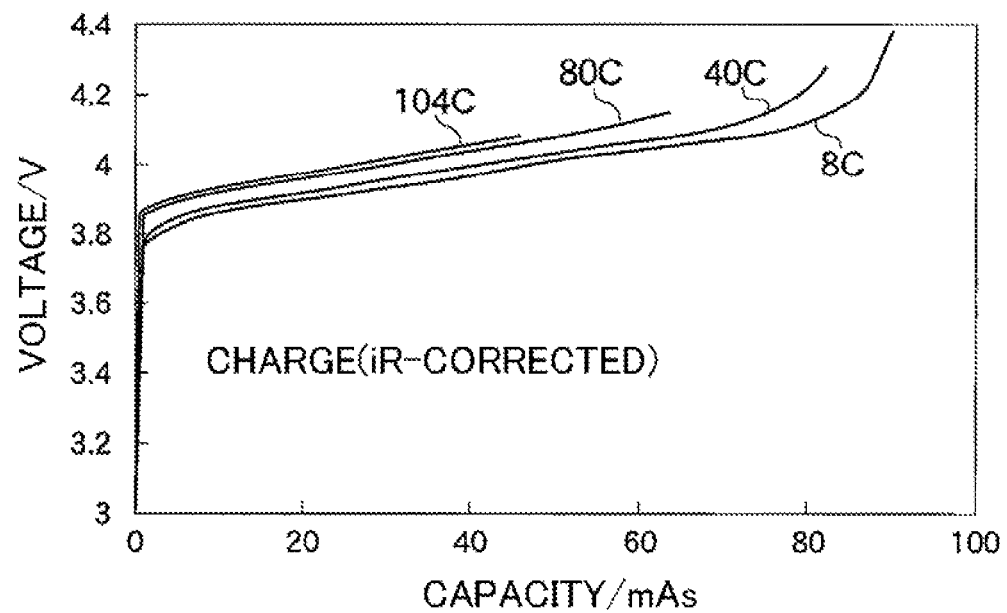

Table 1 shows measurement results obtained while varying the charge/discharge current to 0.2 mA, 0.4 mA, et seq. FIGS. 11A to 11B shows, in regard to some of them, curves of the relationship of voltage and charge/discharge capacity (with iR correction applied thereto). These measurements were performed at a temperature of 23° C., with repeated execution of 21 cycles of charge/discharge operations. The cutoff voltage was 3.0 to 4.4V.

TABLE 1

| C Rate | Charge Capacity(/mAs) | Discharge Capacity (/mAs) | iR Loss (/V) |
| --- | --- | --- | --- |
| 8 | 90 | 90 | 0.025 |
| 16 | 86 | 88.8 | 0.05 |
| 24 | 85.8 | 86.76 | 0.075 |
| 32 | 82.8 | 83.2 | 0.1 |
| 40 | 82.1 | 82.5 | 0.125 |
| 48 | 78.12 | 78.72 | 0.15 |
| 56 | 76.09 | 76.16 | 0.175 |
| 64 | 69.76 | 72 | 0.2 |
| 72 | 67.23 | 68.13 | 0.225 |
| 80 | 63 | 63.2 | 0.25 |
| 88 | 59.18 | 59.62 | 0.275 |
| 96 | 54.24 | 52.08 | 0.3 |
| 104 | 45.24 | 45.76 | 0.325 |

As apparent from this table and the graph, a ratio of the discharge capacity to the charge capacity was 100%. This indicates that the charged amount is dischargeable almost completely and also that there are no appreciable energy storage capacity losses. This result was the same even in the case of the C rate of 104C.

7. Voltamograph of Positive Electrode Structure

Figure 12:
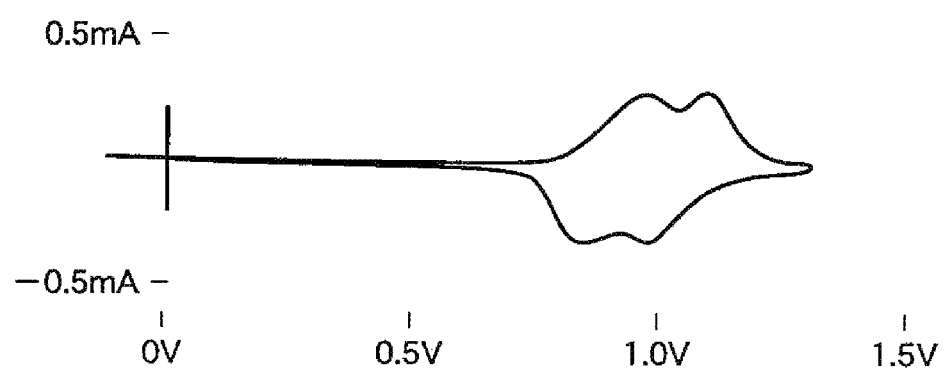
FIG. 12 is a voltamogram of a positive electrode structure.

A voltamograph of the positive electrode structure is shown in FIG. 12. In the case of a potential sweep speed of 1 mV/s, when sweeping with a voltage potential of the positive electrode, twin peaks unique to the lithium manganate were found near a 0.96-V point and a 1.1V point. Alternatively, when sweeping with a negative potential inverted, twin peaks appeared near 1.0V and 0.85V points (peak current: −0.3 mA or more or less).

The present invention is capable of obtaining the efficacy which follows.

This invention is able to enhance the electrical conductivity between active electrode materials.

Alternatively the invention can enhance the conductivity between an active electrode material and an electrical connection assistant agent.

Alternatively the invention can enhance the conductivity between an active electrode material and a current collecting material.

Alternatively the invention can provide a battery and/or a capacitor excellent in performance.

What is claimed is:

1. A lithium rechargeable battery, comprising:
   at least one electrode having
      a current collecting material;
      an electrode layer comprising
         a conductor-mixed active electrode material, wherein
            a flocculent conductive material coats an active electrode material without use of a binder, the conductive material facilitating movement of electrons between the conductive material and the active electrode material, and an electrical conduction assistant, wherein said electrode layer is coupled to a surface of the current collecting material by a binder.

2. The lithium rechargeable battery as set forth in claim 1, wherein said active electrode material is lithium manganate whereas the conductive material is carbon.

3. The lithium rechargeable battery as set forth in claim 1, wherein a surface on the current collecting material in contact with the electrode layer is rough.

4. The lithium rechargeable battery as set forth in claim 1, wherein a current collector layer made of the electrical conduction assistant and an anchor material is between the current collecting material and the electrode layer, and a surface on the current collecting material is in contact with the current collector layer.

5. A method of making a lithium rechargeable battery, comprising the steps of:

producing a current collecting material;

providing an electrode layer by producing a conductor-mixed active electrode material, wherein a flocculent conductive material coats an active electrode material without the use of a binder, the conductive material facilitating movement of electrons between the conductive material and the active electrode material; and producing an electrical conduction assistant, wherein said electrode layer is coupled to a surface of the current collecting material by a binder.

6. The method of making the lithium rechargeable battery as set forth in claim 5, wherein the active electrode material is lithium manganate whereas the conductive material is carbon.

7. A lithium rechargeable battery, comprising:

at least one electrode having a current collecting material;

an electrode layer comprising;

a conductor-mixed active electrode material, wherein a flocculent conductive material coats an active electrode material without the use of a binder, the conductive material facilitating movement of electrons between the conductive material and the active electrode material;

an electrical conduction assistant, wherein said electrode layer is coupled to a surface of the current collecting material by a binder; and an anchor material partially depressed against said current collecting material and between said current collecting material and said electrode layer.

8. The lithium rechargeable battery as set forth in claim 7, wherein said active electrode material is lithium manganate whereas the conductive material is carbon.

9. The lithium rechargeable battery as set forth in claim 7, wherein the current collecting material in contact with the electrode layer has a surface having more than one recess portion.

10. The lithium rechargeable battery as set forth in claim 7, further comprising a current collector layer including the electrical conduction assistant.

11. The lithium rechargeable battery as set forth in claim 4, wherein the surface on the current collecting material which is in contact with the current collector layer is rough.

12. The lithium rechargeable battery as set forth in claim 1, wherein the conductor-mixed active electrode material comprises more than 80 weight % of the active electrode material and less than 20 weight % of the conductive material.

13. The lithium rechargeable battery as set forth in claim 12, wherein the conductor-mixed active electrode material comprises about 82 weight % of the active electrode material and about 18 weight % of the conductive material.

14. The lithium rechargeable battery as set forth in claim 1, wherein the conductor-mixed active electrode material comprises a plurality of relatively small particles of the conductive material coupled around a relatively large particle of the active electrode material.

15. The method of making the lithium rechargeable battery as set forth in claim 5, wherein producing the conductor-mixed active electrode material comprises stirring and mixing the conductive material and the active electrode material together with a plurality of hard balls to couple the conductive material around the active electrode material via a plurality of impact forces applied by the hard balls.

16. The method of making the lithium rechargeable battery as set forth in claim 5, further comprising the step of spraying an abradant onto the current collecting material to form a plurality of recesses in the current collecting material.

17. The method of making the lithium rechargeable battery as set forth in claim 16, wherein the spraying step gives the current collecting material an average roughness of about 0.1 $\mu$m to about 2 $\mu$m.

18. The lithium rechargeable battery as set forth in claim 9, wherein the electrical conduction assistant is smaller in particle size than each recess portion such that the electrical conduction assistant enters into the recess portions.

19. The lithium rechargeable battery as set forth in claim 9, wherein the electrical conduction assistant is smaller in particle size than the anchor material.

20. The lithium rechargeable battery as set forth in claim 9, wherein the electrical conduction assistant is smaller in particle size than the conductor-mixed active electrode material.

* * * * *